(12) United States Patent
Votoupal

(10) Patent No.: US 6,750,632 B2
(45) Date of Patent: Jun. 15, 2004

(54) STARTING SYSTEM FOR AN INTERNAL COMBUSTION SYSTEM AND METHOD OF OPERATING SAME

(75) Inventor: John J. Votoupal, Bloomington, IL (US)

(73) Assignee: Caterpillar Inc, Peoria, IL (US)

( * ) Notice: Subject to any disclaimer, the term of this patent is extended or adjusted under 35 U.S.C. 154(b) by 44 days.

(21) Appl. No.: 10/161,852

(22) Filed: Jun. 4, 2002

(65) Prior Publication Data

US 2003/0222624 A1 Dec. 4, 2003

(51) Int. Cl.[7] .................................................. H02J 7/00
(52) U.S. Cl. ........................................ 320/134; 320/103
(58) Field of Search .................................. 320/134, 139, 320/162, 103, 128, 129, 104, 135

(56) References Cited

U.S. PATENT DOCUMENTS

| | | |
|---|---|---|
| 4,719,427 A * | 1/1988 | Morishita et al. ........... 324/427 |
| 5,193,067 A | 3/1993 | Sato et al. |
| 5,280,231 A | 1/1994 | Kato et al. |
| 5,412,323 A | 5/1995 | Kato et al. |
| 5,621,302 A | 4/1997 | Shinohara |
| 5,675,258 A | 10/1997 | Kadouchi et al. |
| 6,076,964 A | 6/2000 | Wu et al. |
| 6,118,237 A | 9/2000 | Kikuchi et al. |
| 6,150,793 A * | 11/2000 | Lesesky et al. ............. 320/104 |
| 6,160,383 A * | 12/2000 | Carkner ....................... 320/150 |
| 6,271,643 B1 | 8/2001 | Becker et al. |
| 6,278,260 B1 | 8/2001 | Yang |
| 6,331,762 B1 * | 12/2001 | Bertness ...................... 320/134 |

* cited by examiner

Primary Examiner—Rajnikant B. Patel
(74) Attorney, Agent, or Firm—R Carl Wilbur

(57) ABSTRACT

An apparatus and method for determining the performance of a starting system for an internal combustion engine is disclosed. Preferably the system includes an energy supply connected with a starting motor and a charger for charging the energy supply. An electronic controller determines operating characteristics of the energy supply and starting system.

22 Claims, 2 Drawing Sheets

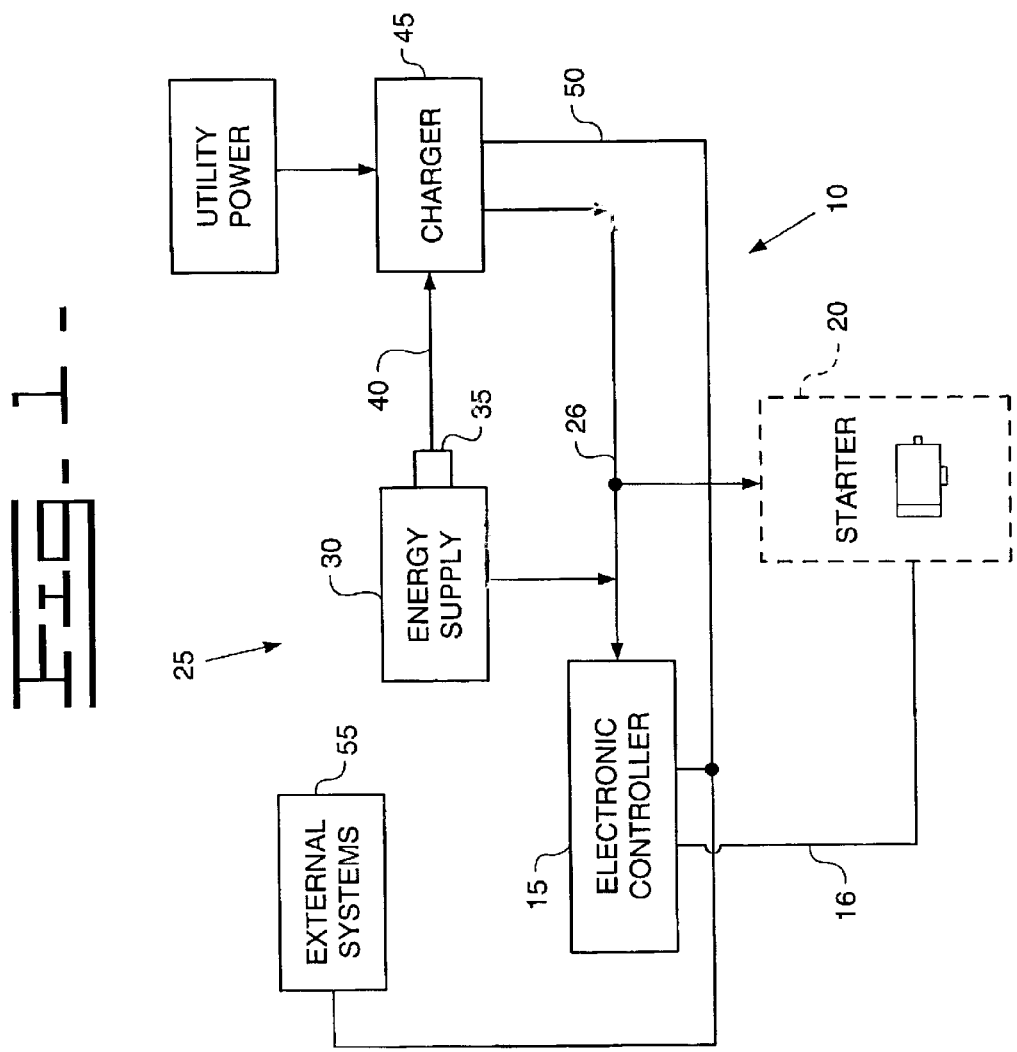

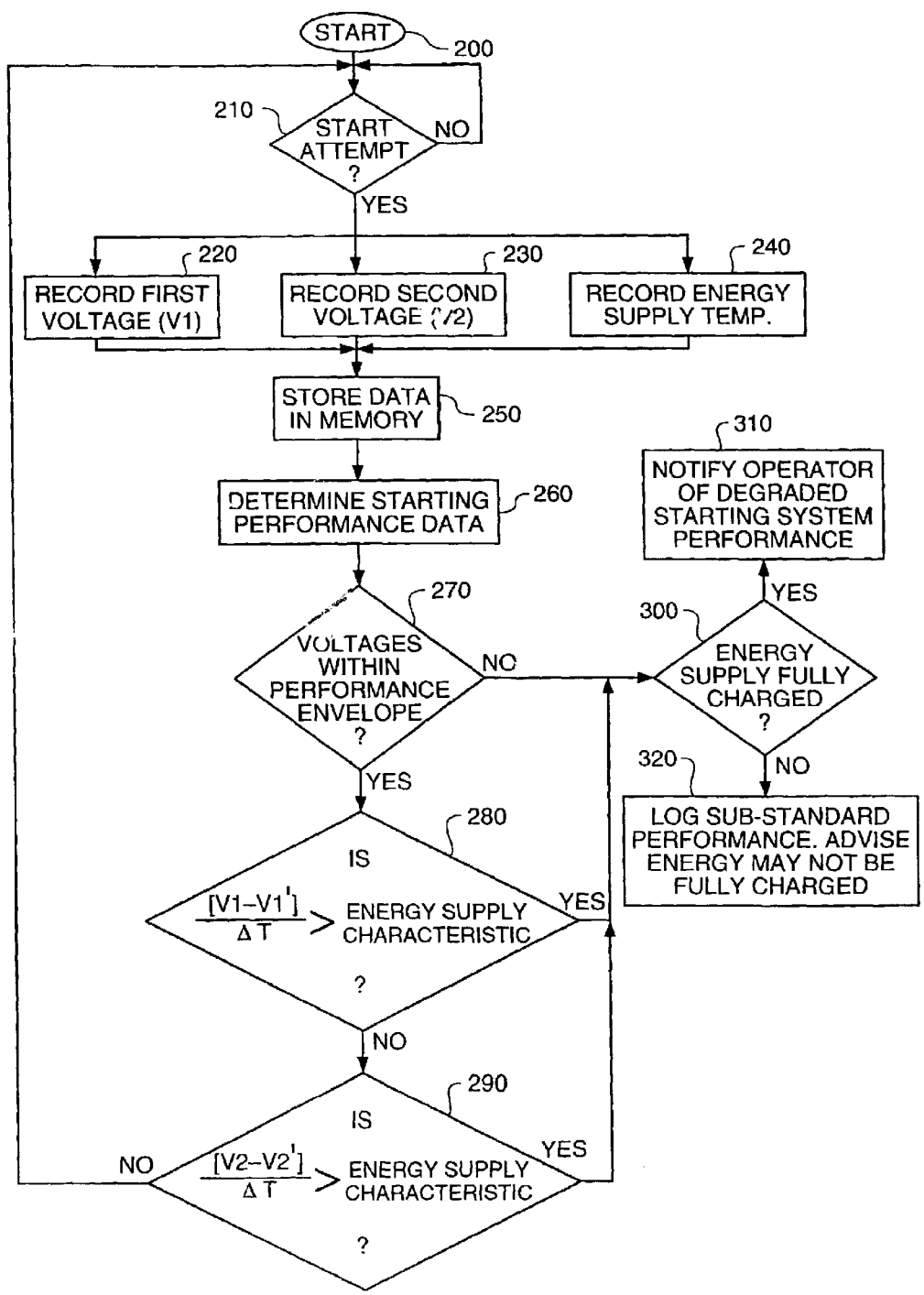

STARTING SYSTEM FOR AN INTERNAL COMBUSTION SYSTEM AND METHOD OF OPERATING SAME

TECHNICAL FIELD

The present invention relates generally to the field of internal combustion engines, and more particularly to starting systems for such engines.

BACKGROUND

Internal combustion engines are generally started using a starting motor that engages gears on the engine flywheel to cause the engine crankshaft to begin turning thereby causing the pistons to move within the cylinders. As the engine turns over, fuel is introduced into the engine cylinders and in the case of spark ignited engines, the spark plugs are energized to cause the fuel to ignite, thereby causing the engine to start running. In the case of compression ignited engines, the fuel ignites when the compression and heat in the cylinder reach sufficient levels and the engine thereafter starts running.

To start the engine, a controller or other circuitry must cause a gear on the starter motor to engage the gearing on the flywheel, and must also cause electrical current to be applied to the starter motor to cause the motor to begin turning the engine. As is know to those skilled in the art, the starter motor generally requires a significant amount of power, which is generally supplied by a battery. In the event that the battery, or other devices in the starting system are performing less than optimally, then the starting system may have difficulty or may be unable to start the engine.

It is important to be able to determine the performance level of the starting system in many applications. For example, when an engine is used in connection with a generator set that is used to supply standby power, it is important to know whether the starting system performance is sufficient to start the engine. Prior art systems generally measure battery voltage to determine whether there is sufficient power to start the engine. However, it would be preferable to have a system that could determine whether the starting system performance was degrading even though it may be within acceptable limits. This would then allow the operator to take preventative action and perform starting system maintenance prior to a complete starting system failure.

SUMMARY OF THE INVENTION

These and other aspects and advantages of the present invention will be apparent to those skilled in the art upon reading the following detailed description of the invention in conjunction with the drawings and appended claims.

BRIEF DESCRIPTION OF THE DRAWINGS

A preferred embodiment of the invention is shown in the drawings. The same reference numbers are used to refer to the same elements throughout the drawings in which:

FIG. 1 illustrates a system level block diagram of a starting system employing a preferred embodiment of the present invention; and FIG. 2 illustrates a flow chart of a control algorithm illustrating software control associated with a preferred embodiment of the invention.

DETAILED DESCRIPTION

Referring first to FIG. 1, a system level block diagram of a preferred embodiment of a starting system 10 used in connection with an internal combustion engine on a generator set is shown. Although the following preferred embodiment is described in connection with a starting system used in connection with a generator set, those skilled in the art will recognize that the invention can be used with other internal combustion engines that are used in systems other than generator sets. For example, the present invention could also be applied to starting systems for internal combustion engines for on-highway trucks, automobiles, off highway trucks, mining and construction equipment and other internal combustion engine applications.

As shown in FIG. 1, the starting system 10 includes an electronic controller 15 that is connected with a starting motor 20 over an electrical connector 16. The starting motor 20 is associated with an internal combustion engine (not shown). The electronic controller 15 is also connected with an energy supply 25 over an electrical connector 26. In a preferred embodiment the energy supply 25 includes a battery or batteries 30 that provide power to the electronic controller 15, to the starting motor 20, and, in some embodiments, other systems (not shown). An energy supply temperature sensor 35 is associated with the energy supply 25 and provides an energy supply temperature signal on connector 40 to a battery charger 45. In the embodiment shown in the drawing the battery charger 45 is associated with the starting system 10 and provides the energy supply temperature sensor signal to the electronic controller 15 on a data link 50. However, those skilled in the art will recognize that in other embodiments, the electronic controller 15 could receive the energy supply temperature signal directly from the energy supply temperature sensor 35.

In a preferred embodiment, the data link 50 is an asynchronous data bus that permits the electronic controller 15 to communicate with the battery charger 45 and other external systems 55 and satisfies the Society of Automotive Engineers (SAE) standard J1939. Although the preferred embodiment uses a J1939 data bus, those skilled in the art will recognize that a direct wired connection or other suitable data bus structures could be readily and easily used without deviating from the scope of the present invention as defined by the appended claims.

As is known to those skilled in the art, the electronic controller 15 issues a starting signal to the starting motor 20 on connector 16, which preferably activates a solenoid and causes a starter motor gear to engage gearing on the flywheel of the internal combustion engine. The starting signal also causes the energy supply voltage to be applied across the starter motor windings thereby causing the starter motor 20 to turn. The starter motor 20 thereby causes the flywheel to turn and begins turning over the engine.

In a generator set application as shown in FIG. 1, the battery charger 45 preferably controls the application of a charging current to the energy supply 25 when the internal combustion engine is not running. As is dictated by the National Fire Protection Act (NFPA) standards, a level 1 battery charger must be capable of charging the battery or batteries after twenty-four hours of charging and a level 2 battery charger must be capable of charging a battery or batteries after 36 hours. As is known to those skilled in the art, the charging current applied by the battery charger 45 to the energy supply 25 across connector 26 is a function of several factors including the energy supply temperature as determined by the energy supply temperature signal on connector 40.

Referring now to FIG. 2, a flow chart depicting a preferred embodiment of an algorithm of the software control used in connection with the electronic controller 15 and the starting system 10 is shown. Program control begins in block 200 and passes to block 210.

In block 210, the electronic controller 15 determines whether the system is attempting to start the engine. In a preferred embodiment, the electronic controller determines that an attempt is being made when the controller 15 issues a start command over connector 16 to the starter motor 20. However, in other embodiments, the electronic controller may look at other signals or conditions to determine whether the system is attempting to start the engine, including a sensed engine speed, a key switch or other conditions. If the system is not attempting to start the engine then control for this algorithm loops back to block 210. Otherwise program control passes to blocks 220, 230 and 240.

In block 220, the electronic controller determines a first voltage (V1) applied by the energy supply 25 across the starter motor 20 at a first predetermined time period after the initiation of the starting attempt in block 210. In block 230, the electronic controller 15 determines a second voltage (V2) applied by the energy supply 25 across the starter motor at a second predetermined time period after initiation of the starting attempt in block 210. In a preferred embodiment, the first and second predetermined times are 2 seconds and 10 seconds, respectively. However, those skilled in the art will recognize that other times could be readily and easily employed without deviating from the scope of the present invention, as defined by the appended claims. In block 240, the electronic controller reads the energy supply temperature signal from the data bus 50 at a time during the starting attempt. From blocks 220, 230 and 240, program control passes to block 250.

In block 250, the electronic controller stores the data from blocks 220, 230 and 240 in memory. Program control then passes to block 260.

In block 260, the electronic controller 15 reads certain starting system performance data from memory. In a preferred embodiment, the starting system performance data is determined as a function of the components of the starting system including the specific energy supply, starter motor and battery charger. The starting system performance data may include data such as an expected first voltage and an expected second voltage for the energy supply at the first and second predetermined times, respectively, at the sensed energy supply temperature. From block 260, program control passes to block 270.

In block 270, the electronic controller 15 determines whether the first and second voltages measured in blocks 220 and 230 are within a predetermined tolerance of the first and second expected voltages determined in block 260. If so then program control passes to block 280, otherwise program control passes to block 300.

In block 280, the electronic controller 15 compares the first voltage (V1) with a predetermined first voltage value (V1') (for the first time that the starting system is operated) or a previous measurement of the first voltage (V1'), by calculating the absolute value of the difference between V1 and V1'. This value is then divided by the elapsed time between the current first voltage measurement and the previous first voltage measurement to produce a change in voltage rate. The change in voltage rate is then compared with a predetermined change in voltage rate and if the calculated change in voltage rate exceeds the predetermined change in voltage rate then program control passes to block 300, otherwise program control passes to block 290. In a preferred embodiment, the previous measurement of the first voltage is measured at the first predetermined time for the immediately previous attempt to start the engine. However, other values representative of previous first voltage measurements could readily and easily be used without deviating from the scope of the present invention as defined by the appended claims. For example, in some embodiments, the predetermined first voltage might be an average or a weighting of previous first voltage measurements. A predetermined first voltage value is read from memory the first time the engine is started because there have been no previously measured first voltage values.

In block 290, the electronic controller 15 performs a similar change in voltage rate calculation for the second voltage (V2). The electronic controller 15 compares the second voltage (V2) with a predetermined second voltage value (V2') (for the first time that the starting system is operated) or a previous measurement of the second voltage (V2'), by calculating the absolute value of the difference between V2 and V2'. This value is then divided by the elapsed time between the current second voltage measurement and the previous second voltage measurement to produce a change in second voltage rate. The change in second voltage rate is then compared with a predetermined change in second voltage rate and if the calculated change in second voltage rate exceeds the predetermined change in voltage rate then program control passes to block 300, otherwise program control returns to block 200.

In block 300, the electronic controller 15 determines whether the battery charger 45 had sufficiently charged the energy supply 25 between starting attempts. In a preferred embodiment, the electronic controller makes this determination by calculating the length of time that the battery charger had been charging the energy supply between start attempts. For example, in one embodiment the electronic controller determines whether the battery charger had been applying a charge to the energy supply for more than 24 hours. If, in block 300, the electronic controller determines that the energy supply had been sufficiently charged, then program control passes to block 310, otherwise program control passes to block 320.

In block 310, the electronic controller 15 notifies the operator that the starting system performance is degraded and preferably advises the operator to call a maintenance technician to service the starting system. In a preferred embodiment, when the starting system of the present invention is used in connection with a generator set, the notification may appear on a display screen associated with the generator set controller, or the electronic controller may transmit the notification through known communications means to a remote location.

In block 320, the electronic controller 15 logs an indication in memory that the starting system was performing at a reduced level and issues a notification to the operator that the energy supply may not be fully charged.

The flowchart described above depicts a preferred embodiment of the algorithm used in connection with a preferred embodiment of the invention. Those skilled in the art will recognize that similar algorithms and software control may be used without deviating from the scope of the present invention.

INDUSTRIAL APPLICABILITY

The present invention is particularly useful in connection with generator set applications used for stand-by power. In stand-by power applications, the engine in the generator set is generally off, but is started at predetermined intervals and when the generator set senses an interruption in the power supplied by the utility service. Since it is important that the generator set engine start when the utility power is interrupted, it is important that the user know when the starting system performance is degraded, so that repairs may be made prior to a failure of the starting system. In this way, an embodiment of the present invention is better able to insure that the generator set will start when there is a power interruption.

Referring to the flowchart shown in FIG. 2, the system generally determines that the starting system performance is degraded by monitoring the voltage applied to the starter motor at specific times when the starter is attempting to start the engine. Those values are adjusted for the energy supply temperature, since available battery voltage is generally a function of temperature. If either of those voltages are outside a predetermined tolerance of an expected value, then the system checks to see whether the batteries were fully charged and issues a notification to the operator that the starting system performance is degraded.

The system also checks to see how much the voltages measured at those specific times have changed from one start attempt to the next. Thus, even if the battery voltage is within the predetermined tolerance of the expected value, if it has changed sufficiently over a short period of time, then that also is an indication that the starting system performance is showing a trend toward reduced performance. In this case, the system again determines whether the batteries were fully charged and issues a notification to the operator that the starting system performance is degraded.

In this manner, the present system provides a method and apparatus for determining the performance level of a starting system associated with an internal combustion engine.

What is claimed is:

1. A starting system for an internal combustion engine, comprising:
   an energy supply;
   a starter motor connected with said engine and said energy supply;
   an electronic controller connected with said engine and said starter, said electronic controller causing said energy supply to controllably apply electrical power to said starter motor thereby causing the engine to begin turning over;
   wherein said electronic controller determines a first voltage applied to said starter motor at a first time period after said electrical power is applied to said starter motor;
   wherein said electronic controller compares said first voltage to an expected first voltage for said first time period; and
   said electronic controller determines starting system performance as a function of said comparison of said first voltage to the expected first voltage.

2. The starting system of claim 1, wherein said electronic controller determines said first voltage at about two seconds after power is applied to said starter motor.

3. The starting system of claim 1, including an energy supply temperature sensor, said temperature sensor producing a temperature signal indicative of a temperature of said energy supply, wherein said electronic controller determines said expected first voltage as a function of said temperature signal.

4. The starting system of claim 1, wherein said electronic controller determines a first change in voltage rate as a function of the first voltage, a prior measurement of the first voltage, and a time elapsed between the measurement of the first voltage and the prior measurement of the first voltage; and
   wherein said electronic controller determines starting system maintenance is required as a function of said change in voltage rate.

5. The starting system of claim 3, wherein said electronic controller determines a first change in voltage rate as a function of the first voltage, a prior measurement of the first voltage, and a time elapsed between the measurement of the first voltage and the prior measurement of the first voltage; and
   wherein said electronic controller determines starting system maintenance is required as a function of said change in voltage rate.

6. The starting system of claim 4, wherein said electrical energy supply includes at least one battery.

7. The starting system of claim 5, wherein said electrical energy supply includes at least one battery.

8. The starting system of claim 6, wherein said electronic controller determines the charge state of the battery and determines that starting system maintenance is required as a function of said determination of said battery charge state.

9. The starting system of claim 8, wherein said electronic controller determines the charging state of the battery by determining whether a battery charging voltage has been applied to the battery for greater than a predetermined period of time.

10. The starting system of claim 9, wherein the predetermined period of time is at least twenty-four hours.

11. The starting system of claim 9, wherein the predetermined period of time is at least thirty-six hours.

12. The starting system of claim 1, wherein said electronic controller determines a second voltage applied to said starter motor at a second time period after said electrical power is applied to said starter motor, and said electronic controller compares said second voltage to an expected second voltage for said second time period and determines starting system performance as a function of said comparison.

13. The starting system of claim 12, wherein said electronic controller measures said second voltage at about ten seconds after electrical power is applied to said starter motor.

14. The starting system of claim 12, wherein said electronic controller determines a first change in voltage rate as a function of the first voltage, a prior measurement of the first voltage, and a time elapsed between the measurement of the first voltage and the prior measurement of the first voltage;
   wherein said electronic controller determines a second change in voltage rate as a function of the second voltage, a prior measurement of the second voltage, and a time elapsed between the measurement of the second voltage and the prior measurement of the second voltage; and
   wherein said electronic controller determines starting system performance as a function of said first and second change in voltage rate.

15. The starting system according to claim 14, including an energy supply temperature sensor, said temperature sensor producing a temperature signal indicative of a temperature of said energy supply, wherein said electronic controller determines said expected second voltage as a function of said temperature signal.

16. The starting system of claim 14, wherein said electrical energy supply includes at least one battery.

17. The starting system of claim 16, wherein said electronic controller determines the charge state of the battery and determines starting system performance as a function of said determination of said battery charge state.

18. The starting system of claim 17, wherein said electronic controller determines the charging state of the battery by determining whether a battery charging voltage has been applied to the energy supply for greater than a predetermined period of time.

19. A method of assessing the performance of a starting system associated with an internal combustion engine, said starting system including an energy supply connected with an electronic controller and a starting motor, said energy supply supplying electrical current to the starting motor as a function of a starting signal from said electronic controller to said starting motor, said method comprising:

determining a first starting voltage at a first time subsequent to issuing said starting signal;

determining a second starting voltage at a second time subsequent to issuing said starting signal;

determining an energy supply temperature;

determining a first expected voltage for said first time as a function of said energy supply temperature;

determining a second expected voltage for said second time as a function of said energy supply temperature;

comparing said first starting voltage with said first expected voltage;

comparing said second starting voltage with said second expected voltage; and determining the starting system performance as a function of said steps of comparing.

20. A method according to claim 19, including:

determining a state of the energy supply charging; and determining said starting system performance as a function of said state of energy supply charging.

21. A method according to claim 20, including:

determining a first voltage change rate;

determining a second voltage change rate; and determining said starting system performance as a function of said first and second voltage change rate.

22. A method according to claim 19, including:

determining a first battery voltage change rate;

determining a second battery voltage change rate; and determining said starting system performance as a function of said first and second battery voltage change rate.

* * * * *